United States Patent
Kupinski

(10) Patent No.: US 12,460,973 B2
(45) Date of Patent: Nov. 4, 2025

(54) DEVICES AND METHODS FOR DETERMINING POLARIZATION CHARACTERISTICS FROM PARTIAL POLARIMETRY

(71) Applicant: Arizona Board of Regents on Behalf of the University of Arizona, Tucson, AZ (US)

(72) Inventor: Meredith Kupinski, Tucson, AZ (US)

(73) Assignee: Arizona Board of Regents on Behalf of the University of Arizona, Tucson, AZ (US)

( * ) Notice: Subject to any disclaimer, the term of this patent is extended or adjusted under 35 U.S.C. 154(b) by 189 days.

(21) Appl. No.: 18/562,229

(22) PCT Filed: May 24, 2022

(86) PCT No.: PCT/US2022/030646
§ 371 (c)(1),
(2) Date: Nov. 17, 2023

(87) PCT Pub. No.: WO2022/251159
PCT Pub. Date: Dec. 1, 2022

(65) Prior Publication Data
US 2024/0240986 A1    Jul. 18, 2024

Related U.S. Application Data

(60) Provisional application No. 63/362,430, filed on Apr. 4, 2022, provisional application No. 63/192,395, filed on May 24, 2021.

(51) Int. Cl.
*G01J 4/04*    (2006.01)
*G01N 21/21*    (2006.01)

(52) U.S. Cl.
CPC .............. *G01J 4/04* (2013.01); *G01N 21/211* (2013.01); *G01N 2021/214* (2013.01); *G01N 2021/217* (2013.01)

(58) Field of Classification Search
CPC ........... G01N 21/21; G01N 2201/0636; G01N 2201/0683; G01N 2201/08;
(Continued)

(56) References Cited

U.S. PATENT DOCUMENTS

2002/0008874 A1    1/2002    Lee et al.
2004/0184035 A1 *  9/2004    Li .................... G01N 21/211
                                                            356/369

(Continued)

FOREIGN PATENT DOCUMENTS

BY            4518 C1 *    6/2002
EP       1411333 A1 *    4/2004    ........... G01N 21/211
(Continued)

OTHER PUBLICATIONS

Aiello, A. et al., "Physical Bounds to the Entropy-Depolarization Relation in Random Light Scattering," Physical Review Letters, The American Physical Society, Mar. 11, 2005, 4 pages.
(Continued)

*Primary Examiner* — Michael P Stafira
(74) *Attorney, Agent, or Firm* — Perkins Coie LLP

(57) ABSTRACT

Methods, devices and systems for estimating polarization characteristics of materials based on partial polarimetry are described. One example method for estimating polarization characteristics of a material includes illuminating the material with incident light, which can be unpolarized or have a particular polarization state. Two polarimetric measurements are conducted based on the interaction of the incident light with the material. The two polarimetric measurements detect light having orthogonal polarization states, and the
(Continued)

interaction of the incident light with the material includes a depolarizing interaction. The method additionally includes determining an estimated coherency matrix eigenvalue and an estimated Mueller matrix throughput parameter using the first and the second polarimetric measurements, and determining an estimate of a full depolarizing Mueller matrix by extrapolating a reduced-rank Mueller matrix to obtain all sixteen elements of the depolarizing Mueller matrix that identifies the polarization characteristics of the material.

24 Claims, 11 Drawing Sheets

(58) Field of Classification Search
CPC ....... G01N 2201/12; G01N 2021/8848; G01N 2021/214; G01N 2021/217; G01N 21/211; G01N 21/65; G01N 2021/8883; G01N 2021/8887; G01N 21/23; G01N 21/8851; G01N 21/9501; G01N 21/956; G01N 33/4833; G01N 21/25; G01J 4/04; G01J 3/447; G01J 3/0224; G01J 3/2823; G01J 2003/2826; G01J 3/36; G01J 3/2803; G01J 4/02; G01J 3/44; G01J 4/00; G01J 3/0208; G01J 3/0235; G01J 3/0264; G01J 3/027; G01J 3/42; G01J 3/50
See application file for complete search history.

(56) References Cited

U.S. PATENT DOCUMENTS

| | | | |
|---|---|---|---|
| 2005/0030475 A1 | 2/2005 | Zhou et al. | |
| 2007/0252986 A1 | 11/2007 | Sandstrom | |
| 2009/0051916 A1* | 2/2009 | Otani | G01J 4/04 356/364 |
| 2010/0110433 A1 | 5/2010 | Nedelcu et al. | |
| 2012/0099113 A1 | 4/2012 | De et al. | |
| 2016/0077261 A1 | 3/2016 | Arbabi et al. | |
| 2017/0102319 A1 | 4/2017 | De Martino et al. | |
| 2017/0122809 A1* | 5/2017 | Kanda | G01J 4/00 |
| 2018/0228415 A1* | 8/2018 | Lo | A61B 5/0066 |
| 2021/0299879 A1* | 9/2021 | Pinter | B25J 9/1697 |
| 2022/0034791 A1* | 2/2022 | Zhang | G01N 21/8422 |

FOREIGN PATENT DOCUMENTS

| | | | | |
|---|---|---|---|---|
| EP | 3766403 A1 * | 1/2021 | | A61B 1/303 |
| FR | 3086077 A1 * | 3/2020 | | G01N 21/21 |
| JP | 2008512677 A * | 4/2008 | | H04B 10/07951 |
| JP | 2020110291 A * | 7/2020 | | |
| WO | WO-2011148023 A1 * | 12/2011 | | G01N 21/211 |
| WO | 2022251159 A1 | 12/2022 | | |
| WO | 2022271277 | 12/2022 | | |

OTHER PUBLICATIONS

Arteaga O. and R. Ossikovski, "Complete Mueller matrix from a partial polarimetry experiment: the 12-element case," J. Opt. Soc. Am. A 36, 416-427 (2019).
Azzam, R. M. A., "Photopolarimetric measurement of the mueller matrix by fourier analysis of a single detected signal," Optics Letters 2, 148 (1978).
Baek, S. et al., "Image-Based Acquisition and Modeling of Polarimetric Reflectance," ACM Trans. Graph. vol. 39, No. 4, Article 1 (2020).
Baek, S.-H. D. S. Jeon, X. Tong, et al., "Simultaneous acquisition of polarimetric svbrdf and normals," ACM Trans. Graph. 37 (2018).
Bartell, F. O., et al "The Theory And Measurement Of Bidirectional Reflectance Distribution Function (Brdf) And Bidirectional Transmittance Distribution Function (BTDF)," Radiation Scattering in Optical Systems 0257, 154-160, Int'l Soc. Opt. & Phot., 1981.
Chipman, R. "Metrics for depolarization," SPIE 5888, Polarization Science and Remote Sensing II, Aug. 18, 2005, 11 pages.
Chipman, R. et al., "Polarized Light and Optical Systems," Optical Sciences and Applications of Light, CRC Press (2018).
Cloude S. R. and E. Pottier, "Concept of polarization entropy in optical scattering," Opt. Eng. 36(4) (1995).
Cloude, S. R. "Conditions For The Physical Realisability Of Matrix Operators In Polarimetry," in Polarization Considerations for Optical Systems II, R. A. Chipman, Ed., 1166, 177-187, International Society for Optics and Photonics, SPIE (1990).
Cloude, S. R. "Depolarization synthesis: understanding the optics of Mueller matrix depolarization," J Opt Soc Am A Opt Image Sci Vis, Apr. 1, 2013;30(4):691-700.
Dubreuil, M., S. Rivet, B. L. Jeune, et al., "Snapshot mueller matrix polarimeter by wavelength polarization coding," Opt. Express 15, 13660-13668 (2007).
Gerner, Thomas A., "Full four-dimensional and reciprocal Mueller matrix bidirectional reflectance distribution function of sintered polytetrafluoroethylene," Appl. Opt., Nov. 20, 2017; 56(33): 9333-9340, 16 pages.
Gil, Jose J., "Review on Mueller matrix algebra for the analysis of polarimetric measurements," Journal of Applied Remote Sensing, vol. 8, 2014, 38 pages.
Goldstein, D. H., "Mueller matrix dual-rotating retarder polarimeter," Applied Optics 31, 6676-6683 (1992).
Hagen, N., K. Oka, and E. L. Dereniak, "Snapshot mueller matrix spectropolarimeter," Optics Letters 32, 2100 (2007).
International Search Report and Written Opinion mailed Sep. 14, 2022 for International Patent Application No. PCT/US2022/030646.
Jarecki, Quinn, et al., "Extrapolating Mueller matrices from linear Stokes images," Wyant College of Optical Sciences, University of Arizona. (2022).
Kondo, Y., T. Ono, L. Sun, et al., "Accurate polarimetric BRDF for real polarization scene rendering," in European Conference on Computer Vision, 220-236, Springer (2020).
Kudenov, M.W., M. J. Escuti, N. Hagen, et al., "Snapshot imaging mueller matrix polarimeter using polarization gratings," Opt. Lett. 37, 1367-1369 (2012).
Kuntman, E. et al., "Quaternion algebra for Stokes-Mueller formalism," J Opt Soc Am A Opt Image Sci Vis, Apr. 1, 2019;36(4):492-497.
Kupinski, M. K., Bradley, C. L., Diner, D. J., Xu, F., and Chipman, R. A., "Angle of linear polarization images of outdoor scenes," Optical Engineering 58(8), 1-12 (2019).
L'opez-T'ellez, J. M., R. A. Chipman, L. W. Li, et al., "Broadband extended source imaging Mueller-matrix polarimeter," Opt. Lett. 44, 1544-1547 (2019).
Lemaillet, P., S. Rivet, and B. L. Jeune, "Optimization of a snapshot mueller matrix polarimeter," Opt. Lett. 33, 144-146 (2008).
Li, L. W. et al., "Effects of surface roughness and albedo on depolarization in Mueller matrices," In Polarization: Measurement, Analysis, and Remote Sensing XIV (vol. 11412, p. 1141204). International Society for Optics and Photonics, May 2020, 22 pages.
Li, L. and Kupinski, M., "Merit functions and measurement schemes for single parameter depolarization models," Opt. Express 29, 18382-18407 (Jun. 2021).
Ossikovski R. and O. Arteaga, "Complete Mueller matrix from a partial polarimetry experiment: the nine-element case," J. Opt. Soc. Am. A 36, 403-415 (2019).
Priest, R. and Germer, T., "Polarimetric brdf in the microfacet model: Theory and measurements," Proceedings of the Military Sensing Symposia (MSS) Specialty Group Meeting on Passive Sensors, Undefined (Mar. 1, 2000 00:03:00 2000).
Swami, M., H. Patel, and P. Gupta, "Conversion of 3×3 Mueller matrix to 4×4 Mueller matrix for non-depolarizing samples," Optics Communications 286, 18-22 (2013).
Torrance K. E. and E. M. Sparrow, "Theory for off-specular reflection from roughened surfaces*," J. Opt. Soc. Am. 57, 1105-1114 (1967).

(56) References Cited

OTHER PUBLICATIONS

Zaidi, A., S. McEldowney, Y.-H. Lee, et al., "Towards compact and snapshot channeled mueller matrix imaging," Optics Letters 47, 722 (2022).

* cited by examiner

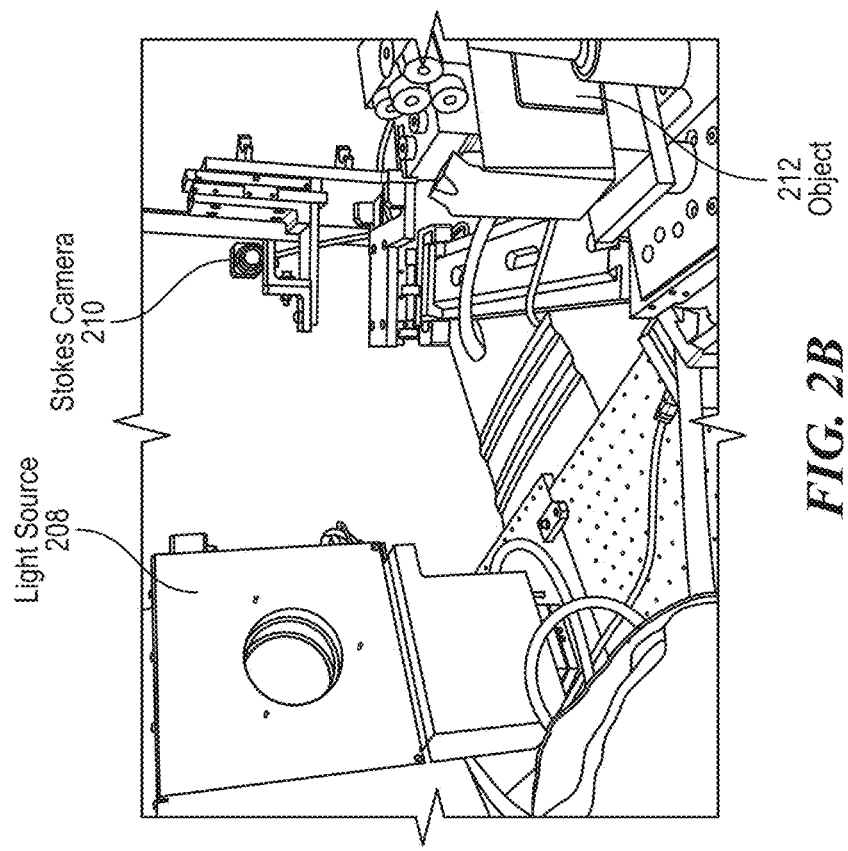
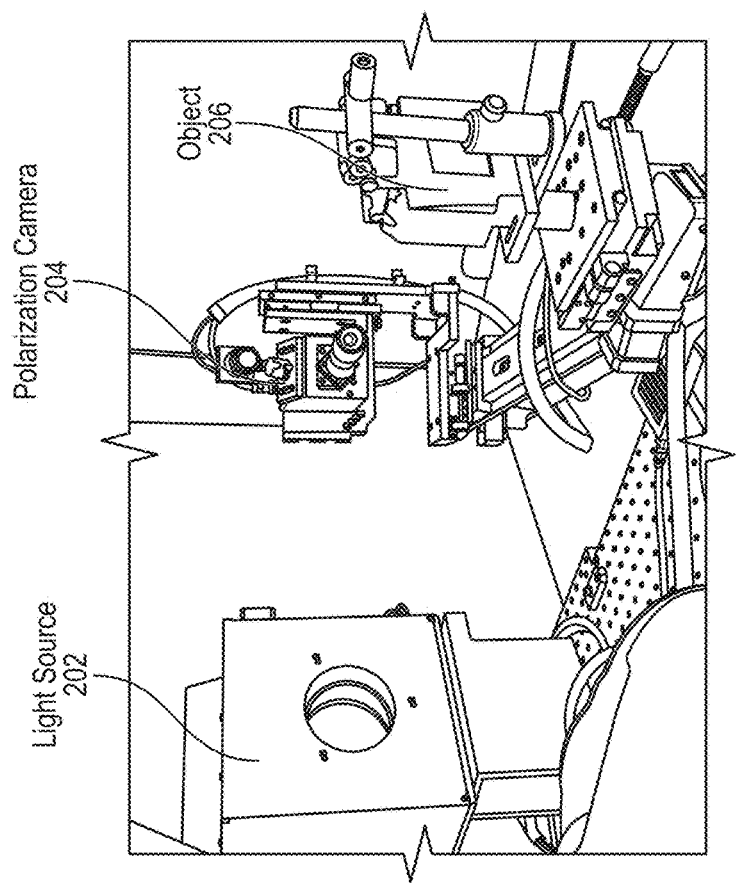

DEVICES AND METHODS FOR DETERMINING POLARIZATION CHARACTERISTICS FROM PARTIAL POLARIMETRY

CROSS-REFERENCE TO RELATED APPLICATIONS

This patent document is a 371 National Stage Application of International Patent Application No. PCT/US2022/030646, filed May 24, 2022, which claims priority to the provisional application with Ser. No. 63/192,395, titled "METHOD OF DETERMINING FRACTIONAL CONTRIBUTION BY FRESNEL REFLECTION USING TWO MEASUREMENTS," filed May 24, 2021, and the provisional application with Ser. No. 63/362,430, titled "MUELLER MATRIX EXTRAPOLATION FROM PARTIAL POLARIMETRY," filed Apr. 4, 2022. The entire contents of the above noted applications are incorporated by reference as part of the disclosure of this document

TECHNICAL FIELD

This patent document generally relates to polarization and more particularly to determining polarization characteristics of materials and objects.

BACKGROUND

Polarization describes the direction of an electromagnetic wave that is perpendicular to the direction of motion of the wave. Polarization is a growing topic of interest in many fields, with applications in astronomy, geology, chemistry, computer vision, image rendering, object detection, imaging and surface reconstruction to name a few. Ellipsometry, a powerful technique for the measurement of the optical properties of a surface, also involves measuring the polarization state of light following specular reflection from such a surface, which can be used to model the (complex) refractive index of the surface of a bulk material, as well as the thin film layers that may be deposited on a substrate.

Another application of polarimetry is in detection of metamers. Metamers are materials that are indistinguishable upon visual inspection either by the human eye or through traditional RGB imaging. For example, a white segment in a scene can be part of the sky, part of a person's white shirt or part of the kitchen cabinetry in the background, all of which can be indistinguishable or metameric when looking only at a small window without further context from the surrounding environment.

The metamers, as well as other types of objects and martials, can be identified based on different characteristics of the object or a material, such as depth variations, the material composition, texture and other properties can be determined based on the states of polarization of light that is either reflected or transmitted from the object. The polarization state of the light can be determined based on the Mueller matrix, which provides the most general and complete description of how the object responds to an incident polarized light in either reflection or transmission. However, determination of the Mueller matrix for depolarizing surfaces (i.e., those surfaces that cause full or partial depolarization of the incident light) can be a time consuming and computationally complex task. Because the Mueller matrix is often used in light-matter interaction models to design and implement optical systems, the complexity of determining and using the Muller matrices is exacerbated for such systems that can include many surfaces and many components with differing materials and surface geometries. It is therefore beneficial to develop techniques that can efficiently and accurately estimate the Mueller matrix and polarization characteristics for various objects and materials.

SUMMARY

The disclosed embodiments relate to methods, devices and systems for estimating polarization characteristics of materials based on partial polarimetry and with a reduced number of measurements. According to some embodiments, two polarimetric measurements are sufficient to determine the full rank Mueller matrix while accounting for depolarizing light-matter interactions. Accordingly, the disclosed embodiments greatly reduce not only the number of measurements and the associated computations, but also significantly reduce the cost and simplify the design of polarimetric measurement systems used for conducing the measurements.

One example method for estimating polarization characteristics of a material includes illuminating the material with incident light, which can be unpolarized light or light having a particular polarization state. The method also includes conducting a first polarimetric measurement of the material based on interaction of the incident light with the material, where the first polarimetric measurement detects light having a first polarization state, and conducting a second polarimetric measurement of the material based on interaction of the incident light with the material, where the second polarimetric measurement detects light having a second polarization state that is orthogonal to the first polarization state. The interaction of the incident light with the material as part of one or both of the first or the second polarimetric measurements includes a depolarizing interaction. The method additionally includes determining an estimated coherency matrix eigenvalue and an estimated Mueller matrix throughput parameter using the first and the second polarimetric measurements, and determining an estimate of a full depolarizing Mueller matrix associated with the material by extrapolating a reduced-rank Mueller matrix to obtain all sixteen elements of the estimated full depolarizing Mueller matrix that identifies the polarization characteristics of the material.

BRIEF DESCRIPTION OF THE DRAWINGS

FIG. 2A illustrates an example bench top system for conducting polarimetric measurements using traditional overdetermined methodology.

FIG. 2B illustrates a bench top system for conducting polarimetric measurements in accordance with an example embodiment.

DETAILED DESCRIPTION

Figure 1:
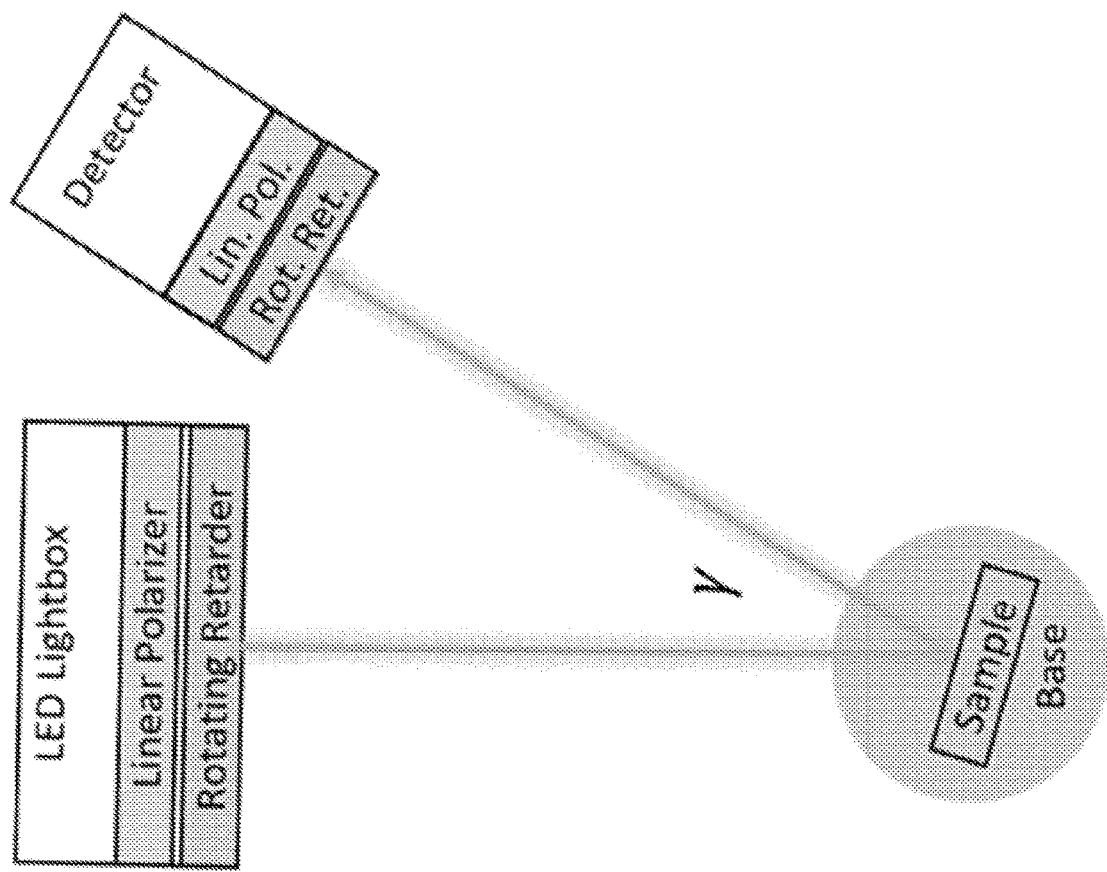
FIG. 1 illustrates a system for measuring polarization characteristics of a sample in accordance with some example embodiments.

As noted earlier, polarization refers to the orientation of oscillation of the electric component of the electromagnetic wave that is light. The light can be fully polarized, unpolarized, or partially polarized, which simply refers to the orderliness and directionality of the pattern traced out by the electric vector as light propagates. The different polarization states are linear, elliptical and circular polarizations.

When polarized light experiences any interaction with matter by being, for example, reflected from, or transmitted through, the material, the polarization state can be changed, thus causing a ray to have a different polarization state than its neighboring rays. This is often referred to as depolarization. Volume scatter events, multiple reflections, and varying material response over wavelength can all be contributing factors to depolarization. Other factors that can contribute to depolarization can stem from processing and measurement operations, such as discretization of continuous scenes into pixels, a detector's exposure time, and non-monochromatic detector responses.

Stokes vectors are often used to characterize polarized light based on flux measurements that could be made in a lab with a set of polarizers. The first value in a Stokes vector, $S_0$, is the total flux with no polarizer (or equivalently the summed fluxes of two orthogonal polarizers). $S_1$ is the difference in flux measured with horizontally and vertically oriented polarizers, $S_2$ is the difference in 45o and 135o polarized flux, and $S_3$ is the difference in right and left circularly polarized flux:

$$\begin{pmatrix} S_0 \\ S_1 \\ S_2 \\ S_3 \end{pmatrix} = \begin{pmatrix} P_0 + P_{90} \\ P_0 - P_{90} \\ P_{45} - P_{135} \\ P_R - P_L \end{pmatrix}. \quad (1)$$

As noted earlier, a Mueller matrix is the most general and complete description of how a material responds to an incident polarized light. The Mueller matrix is represented using a 4 by 4 real-valued matrix, which represents the linear transformation of polarization states upon interaction with a material. Muller matrices act on Stokes vectors through conventional matrix-vector multiplication, as shown below:

$$S' = MS, \quad (2)$$

where S and S' are the Stokes vectors before and after the interaction, respectively, and M is the Mueller matrix, which can be represented by:

$$M = M_{00}m = M_{00} \begin{pmatrix} 1 & m_{01} & m_{02} & m_{03} \\ m_{10} & m_{11} & m_{12} & m_{13} \\ m_{20} & m_{21} & m_{22} & m_{23} \\ m_{30} & m_{31} & m_{32} & m_{33} \end{pmatrix}. \quad (3)$$

Here, the $M_{00}$ element is the throughput averaged for all polarization states, and the normalized Mueller matrix, m, is calculated by factoring it out of all other elements. In this way, the radiometry and polarimetry are separated.

Two properties of the Mueller matrix that can be useful for understanding the disclosed embodiments are polarizance and depolarization. Polarizance is described by the leftmost column of the Mueller matrix (called the polarizance vector) and represents the output polarization state for unpolarized input. Polarizance magnitude (PM) is defined as $$PM = \sqrt{m_{10}^2 + m_{20}^2 + m_{30}^2}, \quad (4)$$

where $m_{n0}$ are the last three elements of the polarizance vector of a normalized Mueller matrix. Depolarization does not have a simple appearance in a Mueller matrix, but is the property of reducing the coherence of the input polarization state, as explained earlier.

Mueller matrices vary over wavelength, illumination direction, observation direction, and the surface normal, and changing these four factors while taking measurements produces a polarized bi-directional reflectance distribution function (pBRDF, or sometimes referred to herein and Mueller pBRDF), which describes how polarized light is radiometrically reflected from a surface.

Some of the measurement disclosed herein were conducted using an example measurement device that includes a polarization light producing subsystem and a detection subsystem, as shown in the example configuration of FIG. 1. For example, an RGB950 polarimeter can be used to capture the Mueller pBRDFs. This expensive device allows the measurement of large and highly diffuse materials, and includes a light source that is followed by a polarization state generator (PSG), which consists of a large aperture linear polarizer and a rotating retarder. These two components produce and control the incident polarization state together. This light strikes the sample that is positioned on a motorized stage which can be precisely rotated for different geometries to allow measurement of the Mueller matrix. For example, the sample can be imaged using an off-the-shelf adjustable camera lens. The measurement device also includes a detection subsystem that includes a detector (e.g., charged coupled device (CCD)) and a polarization state analyzer (PSA), e.g., a rotating quartz waveplate paired with a linear polarizer. The PSA selects the polarization state which propagates to the detector to form a raw polarimetric images.

The Mueller matrix of a sample is determined by performing a series of measurements with different polarization state generator (PSG) and polarization state analyzer (PSA) states. Mathematically, the equation for the $j^{th}$ flux measurement (the $S_0$ component of the Stokes vector at the detector) by a polarimeter is $$P = WM, \quad (5)$$

Where M is a vectorized Mueller matrix, W is the instrument's matrix of the PSG/PSA state pairs, and P is the vector of flux measurements. The estimate of the Mueller matrix $\tilde{M}$ can be calculated by:

$$\tilde{M}_{16\times 1} = W^+ P. \quad (6)$$

where $W^+$ is the pseudoinverse of W. A full rank system, i.e., one with 16 measurements, is the minimum to constrain all 16 degrees of freedom of a Mueller matrix. In practice, more measurements are used to mitigate the effects of noise. This process is done pixel-wise to form a Mueller matrix image. For simplicity, the wavelength dependence of the measurements is ignored, but as noted earlier, the Mueller matrices also exhibit spectral dependencies.

When a full Mueller polarimeter is unavailable, partial polarimetry can be sufficient for some applications. The simplest partial polarimetry technique is linear polarimetry where the PSG and PSA only consist of linear states. This allows for reconstruction of the upper left 3×3 elements of a Mueller matrix, but circular diattenuation and polarizance are not measured. Attempts to use partial polarimetry to extrapolate the full Mueller matrix are a recent development in the field. But existing systems only work for non-depolarizing samples. The disclosed embodiments, on the other hand, relate to methods, devices and systems that account for depolarizing effects of light interactions in extrapolating the full depolarizing Mueller matrices.

As noted earlier, the BRDF describes how polarized light is radiometrically reflected from a surface of a material. This radiometric property can be defined as the ratio of differential output radiance to differential input irradiance $$BRDF(\theta_i, \phi_i, \theta_o, \phi_0) = \frac{dL_o(\theta_i, \phi_i, \theta_o, \phi_0; E_i)}{dE_i(\theta_i, \phi_i)}, \quad (7)$$

where $dE_i$ is the differential incident irradiance, $dL_o$ is the differential reflected radiance, $\theta_i$ and $\phi_i$ are the zenith and azimuth angles of the incident direction, and $\theta_o$ and $\phi_o$ are the zenith and azimuth angles of the observation direction. $\theta_i$ and $\theta_o$ are also referred to as the incident and scattered angles (see also FIG. 1). The dependence on both incident and observation directions is where the term bi-directional comes from.

A very popular BRDF model introduced by Torrance and Sparrow in 1967 is based on the theory of microfacets. Off-specular reflection from a surface with normal n is explained by the combination of small, randomly-oriented mirror-like microfacets with varying surface normals h and a diffuse component. Locally, light hitting each microfacet obeys the law of reflection, so its behavior is angle-dependent. A useful way to think of this is by considering microfacets as being the roughness features that happen to satisfy the law of reflection for a given pair of incident and observation directions $\hat{\omega}_i$ and $\hat{\omega}_o$ respectively. The reflectance of this component is based on the average of the Fresnel equations, though the magnitude is reduced to account for the interaction of adjacent microfacets. Light incident on one microfacet may be blocked by a neighbor preventing full illumination (called shadowing) or light reflected from a microfacet may be blocked by a neighbor from reaching the observer (called masking). The diffuse component is an angle-independent term that describes both light scattered by multiple microfacets before reaching the observer and light that transmits into and then out of the material. The microfacet BRDF model is characterized by the angle-dependent distribution on microfacet orientations, shadowing-masking functions, and the relative weight of specular to diffuse.

Whereas a scalar BRDF is a single-valued function of four variables, polarized bidirectional reflectance distribution functions (pBRDF) are Mueller matrix-valued functions of four variables and a complete description of a pBRDF is therefore 16 times bigger. There is clear computational benefit to using a simplified Mueller matrix model. An additional challenge is that polarization properties are defined in the plane transverse to the ray direction. When considering all possible combinations of input and output directions, keeping track of the basis vectors describing the transverse planes becomes paramount.

The most basic approach to determining the Mueller matrix is to interpret the diffuse term, being the result of random multiple scattering, as being an ideal depolarizer. The ideal depolarizer Mueller matrix has the form $$m_{ID} = \begin{pmatrix} 1 & 0 & 0 & 0 \\ 0 & 0 & 0 & 0 \\ 0 & 0 & 0 & 0 \\ 0 & 0 & 0 & 0 \end{pmatrix}, \quad (8)$$

and has the property of converting all polarization states to unpolarized light.

The pBRDF model explored in this patent document uses the Cloude spectral decomposition, where a depolarizing Mueller matrix can be rewritten as a convex sum of up to four non-depolarizing Mueller matrices:

$$m = \sum_{n=0}^{3} \xi_n \hat{m}_n, \quad (9)$$

where $\xi_n$ are the Cloude coherency matrix eigenvalues normalized so that $\Sigma_{n=0}^{3}\xi_n=1$ and $\hat{m}_n$ are the non-depolarizing (indicated with the hat ˆ) Mueller matrices which also have the property that $$\frac{1}{4}\sum_{n=0}^{3} \hat{m}_n = m_{ID}.$$

When the smaller three eigenvalues of the Cloude coherency matrix are equal, the Mueller matrix has the form $$M = \frac{4M_{00}}{3}\left[\left(\xi_0 - \frac{1}{4}\right)\hat{m}_0 + (1-\xi_0)m_{ID}\right], \quad (10)$$

where $\hat{m}_0$ is the dominant non-depolarizing Mueller matrix and $\xi_0$ now controls the relative weight between this dominant process and the ideal depolarizer. Because the last three eigenvalues are the same, this Mueller matrix is referred to as being triply degenerate (TD). The 16 degrees of freedom of a general Mueller matrix are reduced to 8:1 for $M_{00}$, 1 for $\xi_0$, 3 for the diattenuation orientation and magnitude of $\hat{m}^o$, and 3 for the retardance orientation and magnitude of $\hat{m}_0$. Both $\hat{m}_0$ and $\xi_0$ are functions of the scattering geometry: $\theta_i$, $\phi_i$, $\theta_o$, and $\phi_o$, though these are omitted for brevity.

When the dominant non-depolarizing process is believed to be Fresnel reflection, this model corresponds to the convex sum of Fresnel reflection and depolarizer but now with the fractional contribution of each determined by one parameter estimable from partial polarimetry. According to the disclosed embodiments, based on knowing a priori the dominant coherent process $\hat{m}_0$, the parameters $\xi_0$ can be measured (i.e., estimated) using only two linearly independent polarimetric measurements. However, in practice, since commercially available linear Stokes cameras allow simultaneous acquisition of four (three linearly independent) polarimetric measurements, those additional measurements can be used to improve the measurement results, although the disclosed techniques can be done based on only two measurements, as further described below.

The flux measurements of a triply degenerate Mueller matrix under polarimetric measurement matrix W can be rewritten as a linear system of equations $$P = A^T \alpha, \quad (11)$$

where the superscript T indicates a transpose. Here the matrix A consists of basis vectors formed by polarimetric measurement of the dominant process and the ideal depolarizer $$A = \begin{pmatrix} p_0^T \\ p_{ID}^T \end{pmatrix} = \begin{pmatrix} [W\hat{m}_o]^T \\ [Wm_{ID}]^T \end{pmatrix}, \quad (12)$$

where the 16×1 subscript on the Mueller matrix terms is omitted for brevity and the vector a consists of the coefficients in the model, represented by:

$$\alpha = \begin{pmatrix} \alpha_0 \\ \alpha_{ID} \end{pmatrix} = \frac{4M_{00}}{3} \begin{pmatrix} \xi_o - \frac{1}{4} \\ 1 - \xi_0 \end{pmatrix}. \quad (13)$$

While approximating Mueller matrix measurements as a sum of a non-depolarizing Mueller matrix (i.e., Fresnel reflection) and an ideal depolarizer can be done, this is usually includes fitting the weights as independent parameters. Equation (13) shows clearly that the weights are related by the physical parameter $\xi_0$, so this is the necessary quantity to estimate from measurements, which undermines the assumption of independent parameters. Mo is the radiometric quantity used in a non-polarimetric BRDF, and while can be estimated using exiting, technique, this quantify can also be estimated using the disclosed techniques.

An estimate of the coefficients C can be recovered with the Moore-Penrose pseudoinverse as in:

$$\tilde{\alpha} = [A^T]^+ P = (W\hat{m}_0 \ Wm_{ID})^+ P. \quad (14)$$

Solving the system in Equation (13) for the model parameters, estimates for $\tilde{\xi}_0$ and $\tilde{M}_{00}$ are:

$$\tilde{\xi}_0 = \frac{\frac{1}{4} + \frac{\tilde{\alpha}_0}{\tilde{\alpha}_{ID}}}{1 + \frac{\tilde{\alpha}_0}{\tilde{\alpha}_{ID}}}, \ \tilde{M}_{00} = \frac{3\tilde{\alpha}_0}{r\tilde{\xi}_0 - 1} \quad (15)$$

where $\tilde{\alpha}_0$ and $\tilde{\alpha}_{ID}$ are the elements of $\tilde{\alpha}$. $\tilde{\xi}_0$ is the parameter of interest because it determines the fractional contributions of the dominant coherent process and the ideal depolarizer. This fractional contribution adjusts the depolarization of the Mueller matrix which changes with scattering geometry, albedo, and surface texture.

Based on the disclosed embodiments, the estimation of the Mueller matrix based on depolarizing light-matter interactions can be greatly facilitated by conducting only two polarimetric measurements to determine the parameters, $\tilde{\xi}_0$ and $\tilde{M}_{00}$, which then enables extrapolation to the full depolarizing Mueller matrix using, for example, Eq. (10), for a given dominant non-depolarizing process. As explained in further detail below, Fresnel reflection and Fresnel transmission are examples of dominant non-depolarizing processes. The disclosed techniques thus reduce the number measurements from 16 (but often many more) to only two.

For example, when making only two measurements, P1 and P2, the following relationships can be used to obtain Jo:

$$\xi_0 = \frac{1}{4} + \frac{3}{4}P_\Delta\left(P_\Delta + a_1^T \hat{m}_0 g_1(1 - P_\Delta) - a_2^T \hat{m}_0 g_2(1 + P_\Delta)\right)^{-1}. \quad (16)$$

$$P_\Delta = \left(\frac{P_1 - P_2}{P_1 + P_2}\right). \quad (17)$$

$$P_1 = a_1^T M g_1; P_2 = a_2^T M g_2. \quad (18)$$

Based on the disclosed technology, the polarization of the incident light need not be changed between measurement, which eliminates a need for a polarization state generator (PSG), in fact, the incident light can be unpolarized light. These features allow the illumination system to be implemented at a low cost, e.g., via a simple LED. Furthermore, on the detection side, only two polarization states are required to be measured (e.g., parallel and perpendicular linear polarizations). As a result, estimation of the depolarizing Mueller matrix can be done with fewer computations and with considerably less expensive instrumentation (e.g., a cost reduction from about $80K to $2K). As noted earlier, to take advantage of the existing camera technology, a Stokes camera that makes four simultaneous measurement (i.e., snapshot capture) can be used; the additional measurements can be used to improve the estimation results, although not fundamentally needed. Therefore, the need for a complicated polarization state analyzer (PSA) is also alleviated.

To illustrate the results based on the disclosed technology, the ground-truth Mueller matrix images were taken in a large-area dual rotating retarder Mueller imaging polarimeter referred to as the RGB950 described earlier. FIG. 2A illustrates this configuration in a lab setting, including a light source 202 and a polarization camera 204 that are positioned to illuminate an object 206 with light having different polarization states. This set up allows for different angles of incidence and angels of measurement. In the example experiments, the RGB950 (shown in FIG. 2A) took 40 polarimetric measurements with different PSG/PSA combinations, making it an overdetermined system when reconstructing the 16-elements of a Mueller matrix. Data was taken at three wavelengths: 662±11.17 nm (red), 524±17.32 nm (green), and 451±9.83 nm (blue).

TABLE 1

| $\theta_i$ | $\theta_{o,1}$ | $\theta_{o,2}$ | $\theta_{o,3}$ | $\theta_{o,4}$ | $\theta_{o,5}$ | $\theta_{o,6}$ |
|---|---|---|---|---|---|---|
| −10° | 10° | 20° | 30° | 40° | 50° | 60° |
| −25° | 15° | 25° | 35° | 45° | 55° | 65° |
| −40° | 20° | 30° | 40° | 50° | 60° | 70° |
| −55° | 25° | 35° | 45° | 55° | 65° | 75° |
| −70° | 30° | 40° | 50° | 60° | 70° | 80° |

Thirty scattering geometries shown in Table 1 were measured using a rotation stage for the sample and a goniometric swing arm for the camera. The acquisition geometries are specified on-axis, where $\phi_i$ and $\phi_o$ are 0°. For each angle between the sample surface normal and source, $\theta_i$, there are six angles between the surface normal and the camera, $\theta_o$. The scattering geometries across the field of view of an image will have $\theta_i$, $\phi_i$, $\theta_o$, and $\phi_0$ that deviate from these on-axis values. The results associated with the measurements conducted using the configuration of FIG. 2A provide reference values that can be used to compare with results associated with the partial polarimetric measurements conducted in accordance with the disclosed embodiments.

In contrast to the expensive polarimeter configuration in FIG. 2A, the quad-Bayer linear Stokes camera 210 (shown in FIG. 2B) in this configuration takes 4 polarimetric measurements. This detection system is considered an underdetermined system when trying to recover all 16 degrees of freedom, but it is actually an overdetermined system when trying to recover the two degrees of freedom in the triply degenerate model, as disclosed herein. FIG. 2B also illustrates a light source 208 for illuminating an object 212 (which for this experiment was the same object as in FIG. 2A). Using the configuration of FIG. 2B, samples were measured with the linear Stokes camera 210 by swapping the PSA out of the RGB950, leaving the goniometric components to measure the same scattering geometries and the PSG optics to illuminate the sample (object 212) with polarized light. Only one PSG state was used. Based on the orientation of the polarizer inside the PSG, this state was horizontally polarized. In principle, unpolarized light would also work, but the RGB950 light source was used to keep the illumination consistent.

Figure 3B:
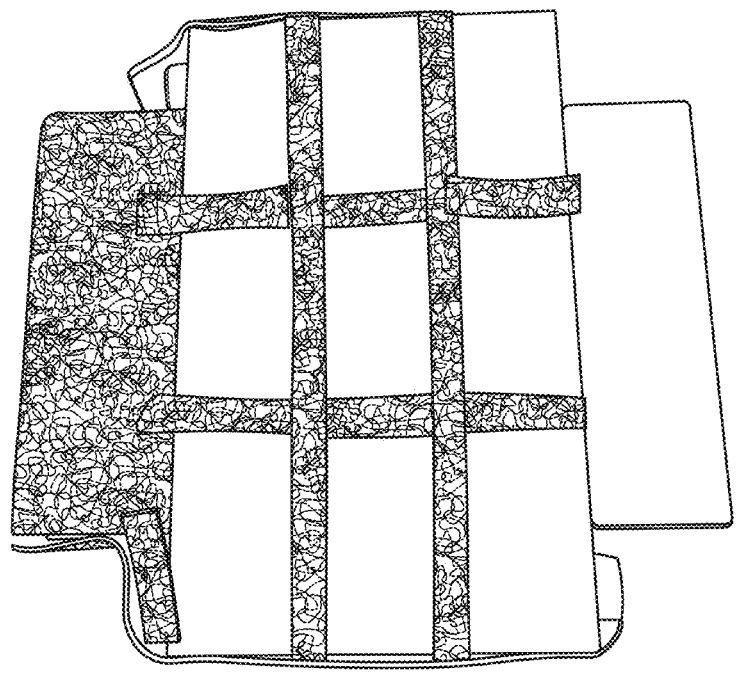
FIG. 3B illustrates a tower of LEGO pieces having differing surface roughness, which can be used to demonstrate the results obtained according to some embodiments.
Figure 3A:
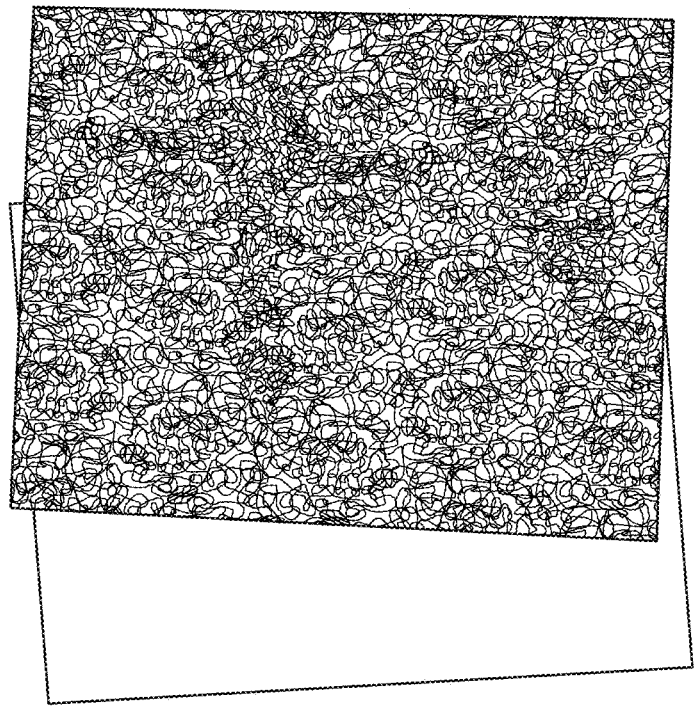
FIG. 3A illustrates a white card and a gray card having differing albedos, which can be used to demonstrate the results obtained according to some embodiments.

Three samples were used to represent objects with differing materials and surface characteristics. The first two are gray and white balance cards shown in FIG. 3A. These are spatially homogeneous and have similar material properties but with different albedos. The third measured sample is a tower made up of individual blue LEGO bricks to form the structure that is shown in FIG. 3B. These are a collection of individual objects (LRGOego pieces) with the same material properties and albedo but with varying texture. The variation in texture was achieved by sanding the surfaces of the individual LEGO bricks to exhibit different roughness. The roughness averages (Ra) in microns for each brick are top: 0.49, 0.56, 3.35, middle: 3.55, 2.62, 0.35, bottom: 1.68, 1.26, 6.32. Black tapes that separate the pieces are used to provide clear visible boundaries between the bricks.

Choosing a sufficiently accurate model for $\hat{m}_0$ to use in Eq. (10) is important. In existing pBRDFs, a common assumption is that the dominant coherent interaction obeys the Fresnel reflection equations. However, the interpretation of the higher albedo of the white card being explained by increased subsurface scattering might indicate that Fresnel reflection is not the dominant process. Some pBRDF models use a Fresnel transmission-based term to describe the light that penetrates the material and scatters back out to the camera. The dominant non-depolarizing Mueller matrix, $\hat{m}_0$, for Fresnel reflection and Fresnel transmission can be represented by, for example:

$$F^R(\theta_d) = \frac{1}{2}\begin{pmatrix} |r_s|^2+|r_p|^2 & |r_s|^2-|r_p|^2 & 0 & 0 \\ |r_s|^2-|r_p|^2 & |r_s|^2+|r_p|^2 & 0 & 0 \\ 0 & 0 & 2\text{Re}[r_p^* r_s] & 2\text{Im}[r_p^* r_s] \\ 0 & 0 & -2\text{Im}[r_p^* r_s] & 2\text{Re}[r_p^* r_s] \end{pmatrix}$$

$$F^T(\theta_t) = \frac{\cos(\theta_t)}{2\sqrt{n^2-\sin^2(\theta_t)}}\begin{pmatrix} |t_s|^2+|t_p|^2 & |t_s|^2-|t_p|^2 & 0 & 0 \\ |t_s|^2-|t_p|^2 & |t_s|^2+|t_p|^2 & 0 & 0 \\ 0 & 0 & 2\text{Re}[t_p^* t_s] & 2\text{Im}[t_p^* t_s] \\ 0 & 0 & -2\text{Im}[t_p^* t_s] & 2\text{Re}[t_p^* t_s] \end{pmatrix}$$

where $r_s$ and $r_p$ are the Fresnel reflection amplitude coefficients for s- and p-polarizations which depend on $\theta_d$ and refractive index n, and $t_s$ and $t_p$ are the Fresnel transmission amplitude coefficients for s- and p-polarizations which depend on the refracted angle $\theta_t$ and index n.

Figure 4:
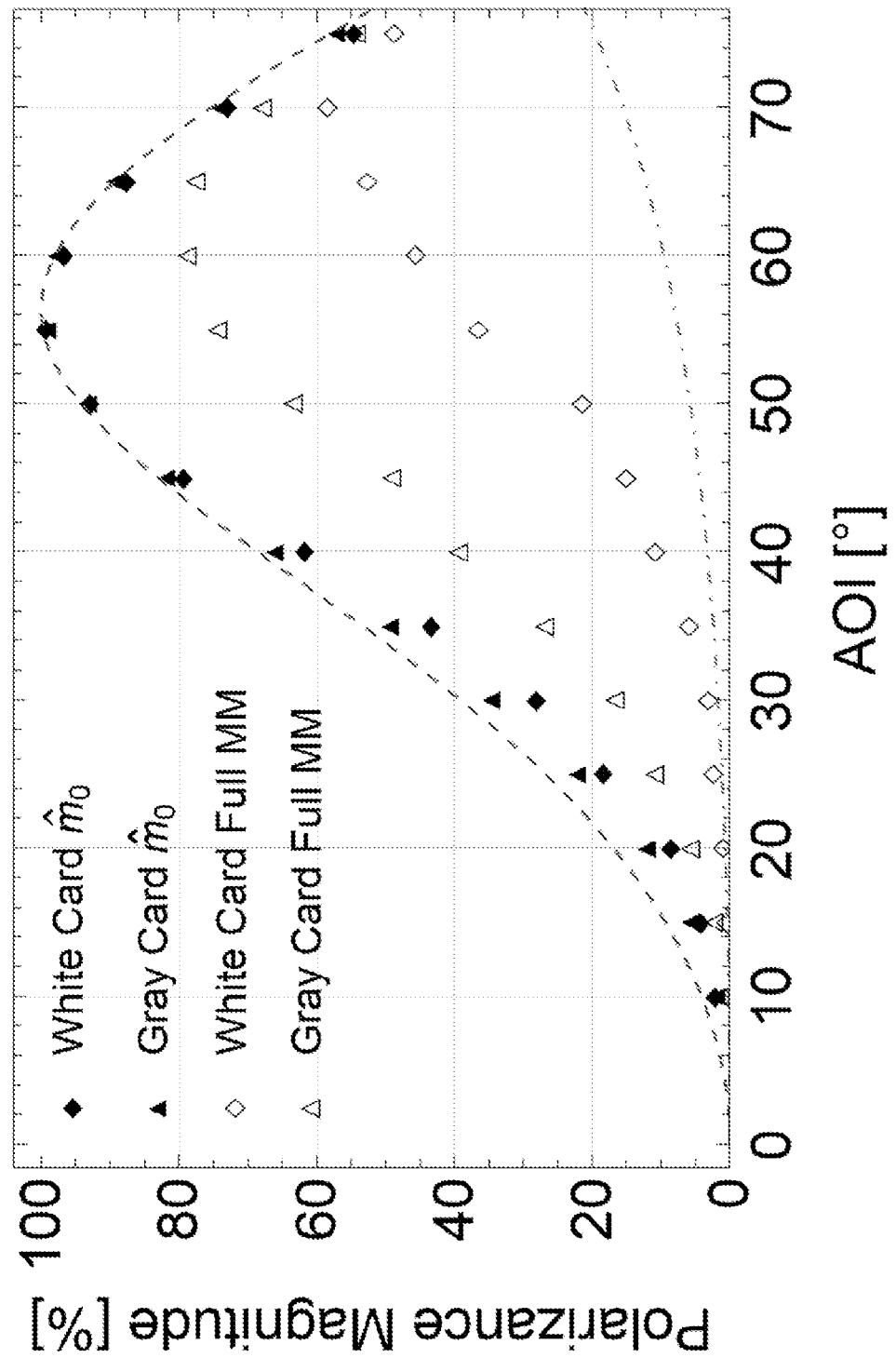
FIG. 4 illustrates example plots of polarizance magnitude associated with the white and gray cards of FIG. 3A versus the angle of incidence.

One of the telltale signatures of the Fresnel equations is a monotonic increase in polarizance magnitude (PM) for transmission and a peak due to a Brewster's angle type effect for reflection. To check if Fresnel transmission should be used as $\hat{m}_0$ for higher albedo materials, the PM of RGB950 measurements of the white and gray balance cards were compared as functions of $\theta_d$. FIG. 4 shows the PM of the white balance card (solid diamonds for estimated and hollow diamonds for full Mueller matrix measurements) and the gray balance card (solid triangles for estimated and hollow triangles for full measurements) versus angle of incidence onto the microfacet measured at 524 nm. Superimposed on this plot are the curves of PM of Fresnel reflection (dashed curve) and Fresnel transmission (dot-dashed curve) of an interface between air and a material with refractive index 1.5. The PM for both balance cards peaks around 56° and then falls off again, consistent with Fresnel reflection rather than the monotonic increase observed in Fresnel transmission. The plots also illustrate that solid markers represent the dominant process $\hat{m}_0$ and open markers are the full measured Mueller matrices. Despite the higher albedo of the white balance card being attributable to more subsurface scattering, the dominant process still matches a Fresnel reflection-type interaction.

Figure 5:
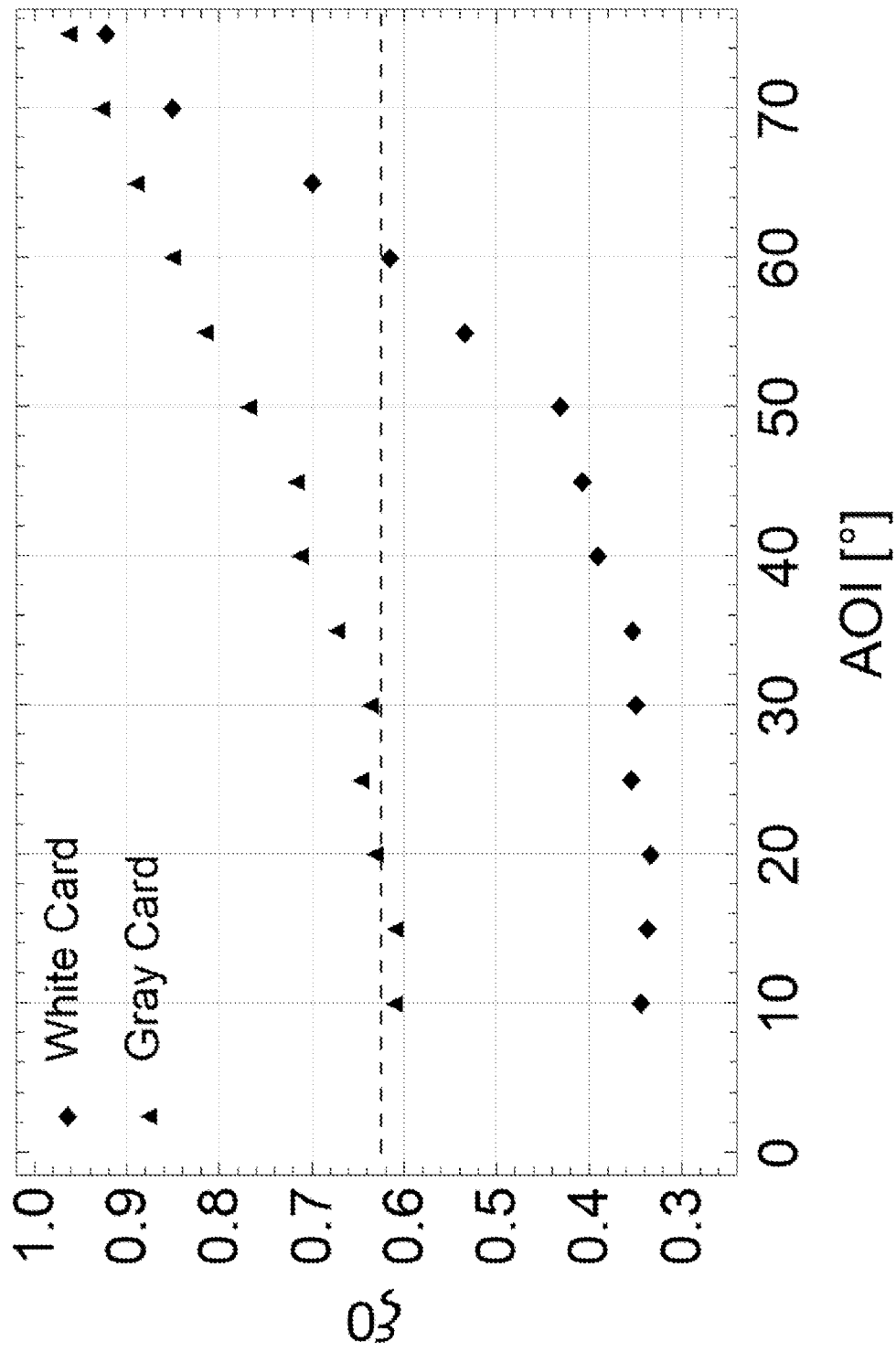
FIG. 5 illustrates example plots of a coherency eigenvalue associated with the white and gray cards of FIG. 3A as a function of the angle of incidence.

FIG. 5 illustrates the dominant coherency eigenvalue $\xi_0$ for the white balance card (diamonds) and gray balance card (triangles) as a function of angle of incidence. The dashed black line is $\xi_0=0.625$ where the dominant coherent process $\hat{m}_0$ and the ideal depolarizer $m_{ID}$ are weighted equally. The Mueller matrix of the white card is dominated by the contribution from $m_{ID}$ until around 60° which is consistent with the association between higher albedo and higher depolarization. Only at high angles of incidence does the contribution from $\hat{m}_0$ dominate the white card Mueller matrix. The lower albedo gray card has approximately equal parts $\hat{m}_0$ and $m_{ID}$ until above 30° when $\hat{m}_0$ dominates. Accordingly, for a triply degenerate Mueller matrix in these experiments, the contribution of $m_{ID}$ outweighs the contribution of $\hat{m}_0$ when $\xi_0 < 0.625$. In this regime, subsurface scattering dominates the interaction, but the single largest coherent process can still be Fresnel reflection. As illustrated, for most of the scattering geometries, the true values of $\xi_0$ are above 0.6 for the gray card and below 0.6 for the white balance card. This also shows that the decrease in the polarizance magnitude of the white balance card at 75° shown in FIG. 3 is not an error in an otherwise monotonic trend, but is actually the result of the Mueller matrix approaching the dominant process.

Example Results

Figure 6A:
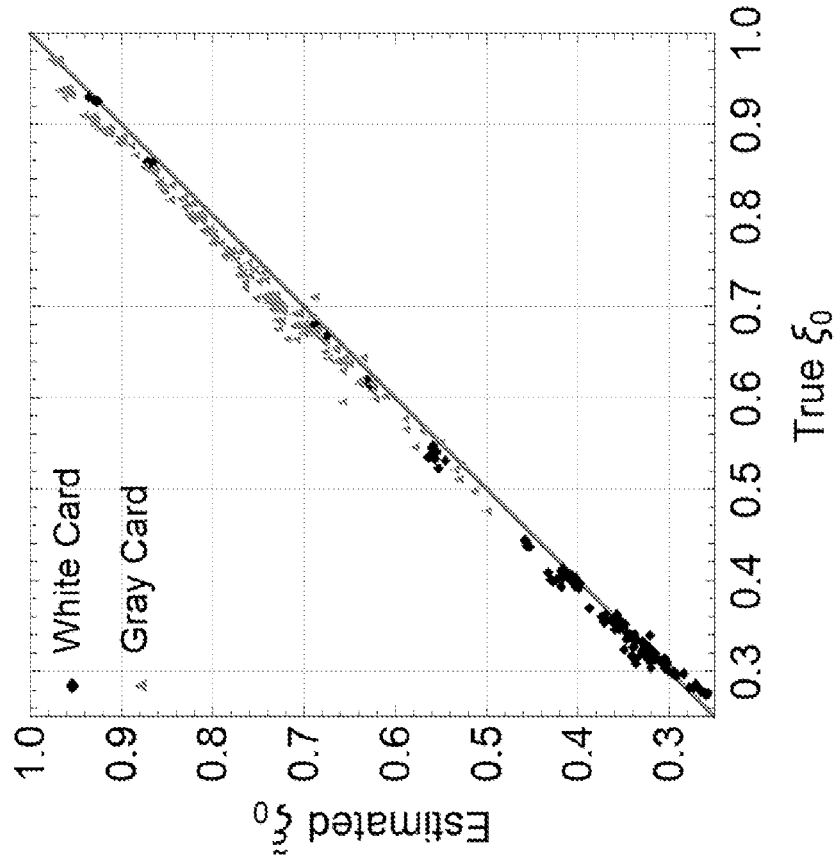
FIGS. 6A and 6B illustrate example comparison plots for the true and estimated values of a coherency eigenvalue for the white and gray cards of FIG. 3A obtained based on full Mueller polarimetry and based on reduced polarimetry measurements.
Figure 6B:
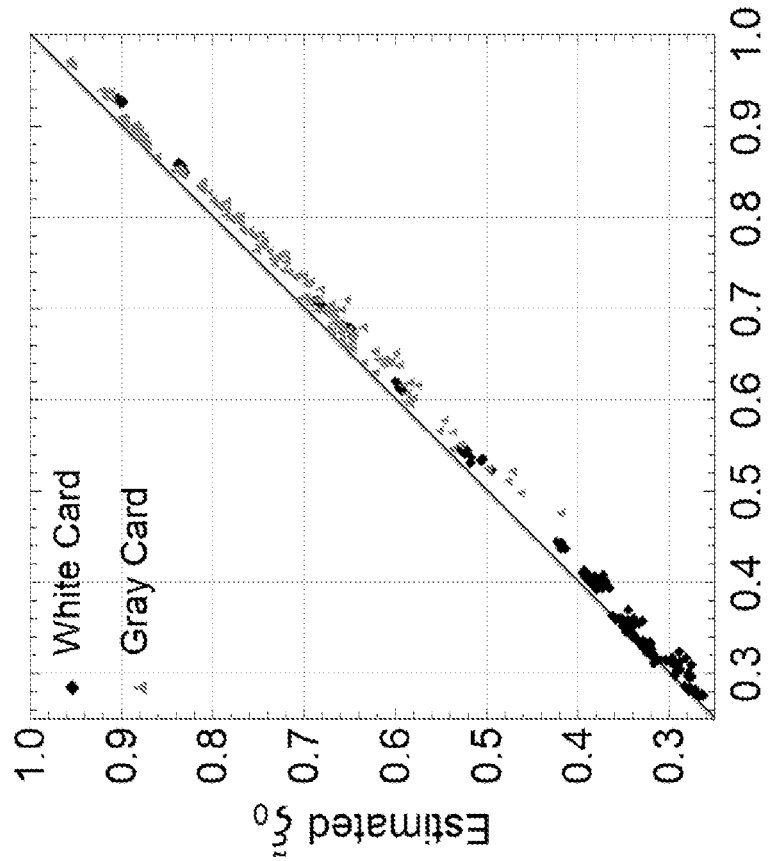

Noise-free reconstructions of the balance card Mueller matrices were simulated using the measurement matrices of two polarimeters: the RGB950 with $W_{40}$ and the linear Stokes camera with $W_4$ where the subscript indicates the number of polarimetric measurements taken. $W_{40}$ is rank 16 and $W_4$ is rank 3, so only the former could be used to uniquely reconstruct a Mueller matrix using the traditional pseudoinverse method. FIGS. 6A and 6B show the results for estimating $\xi_0$ over the 30 acquisition geometries in Table 1, for $W_{40}$ and $W_4$, respectively. These plots illustrate a comparison of the true and estimated values of $\xi_0$ simulating noise-free measurements of the RGB950 (FIG. 6A) and for the measurements made by the linear Stokes camera (FIG. 6B) at 662 nm. The $\xi_0$ values are estimated for a white balance card (and a gray balance card at 5 pixels near the center of the field of view at each acquisition geometry. Simulating the RGB950 produced biases of −0.0151 and −0.0203 and variances of 0.000103 and 0.000514 for the white and gray cards, respectively. Simulating the linear Stokes camera produced biases of 0.0062 and 0.0221 and variances of 0.000119 and 0.000099 for the white and gray cards, respectively. Despite reducing the number of polarimetric measurements by a factor of 10, the biases and variances remained comparable in magnitude and the bias even improved for the white card.

Figure 7A:
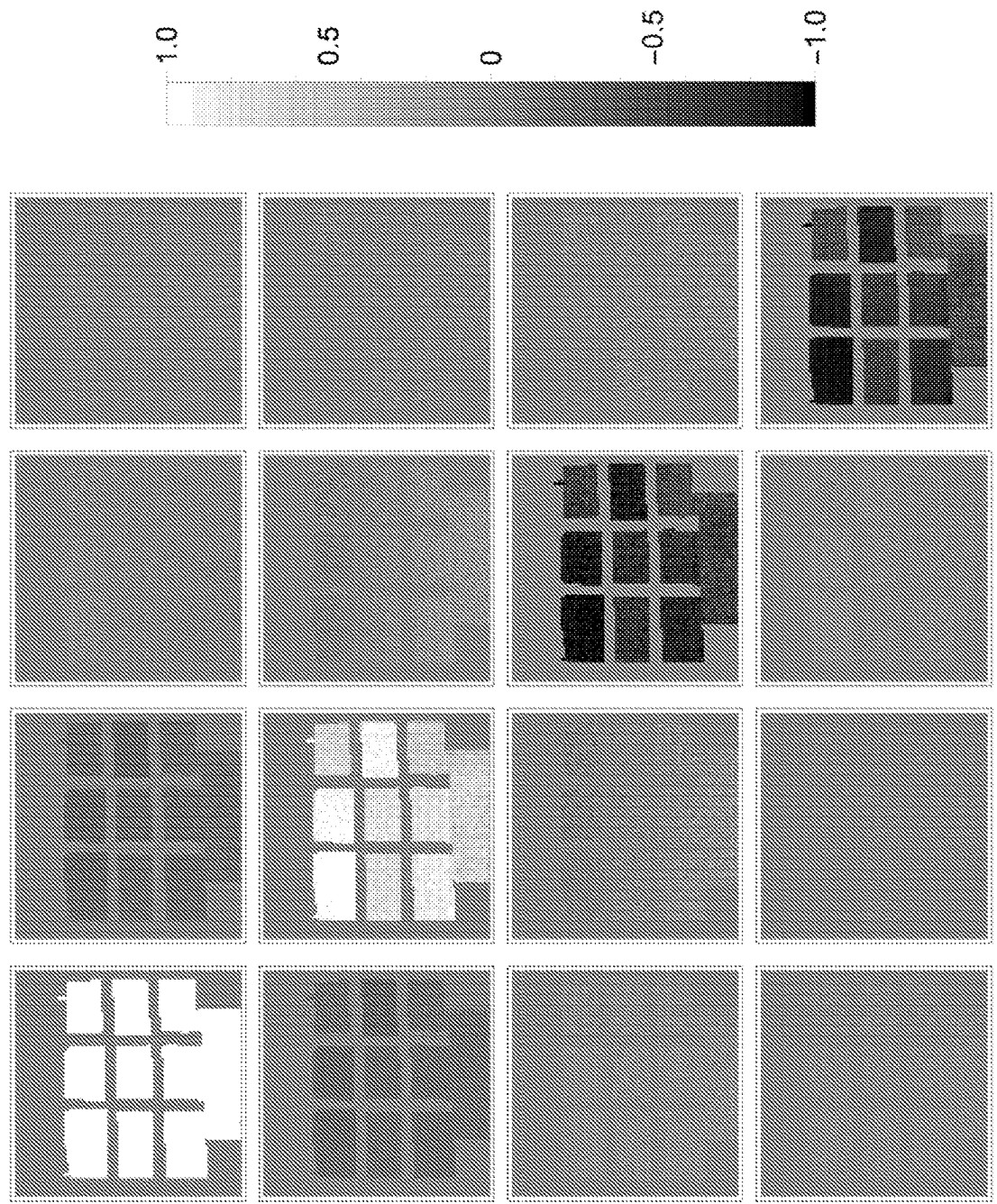
FIG. 7A illustrates an example normalized Mueller matrix image of the LEGO brick tower of FIG. 3B that is reconstructed using full Mueller polarimetry.
Figure 7B:
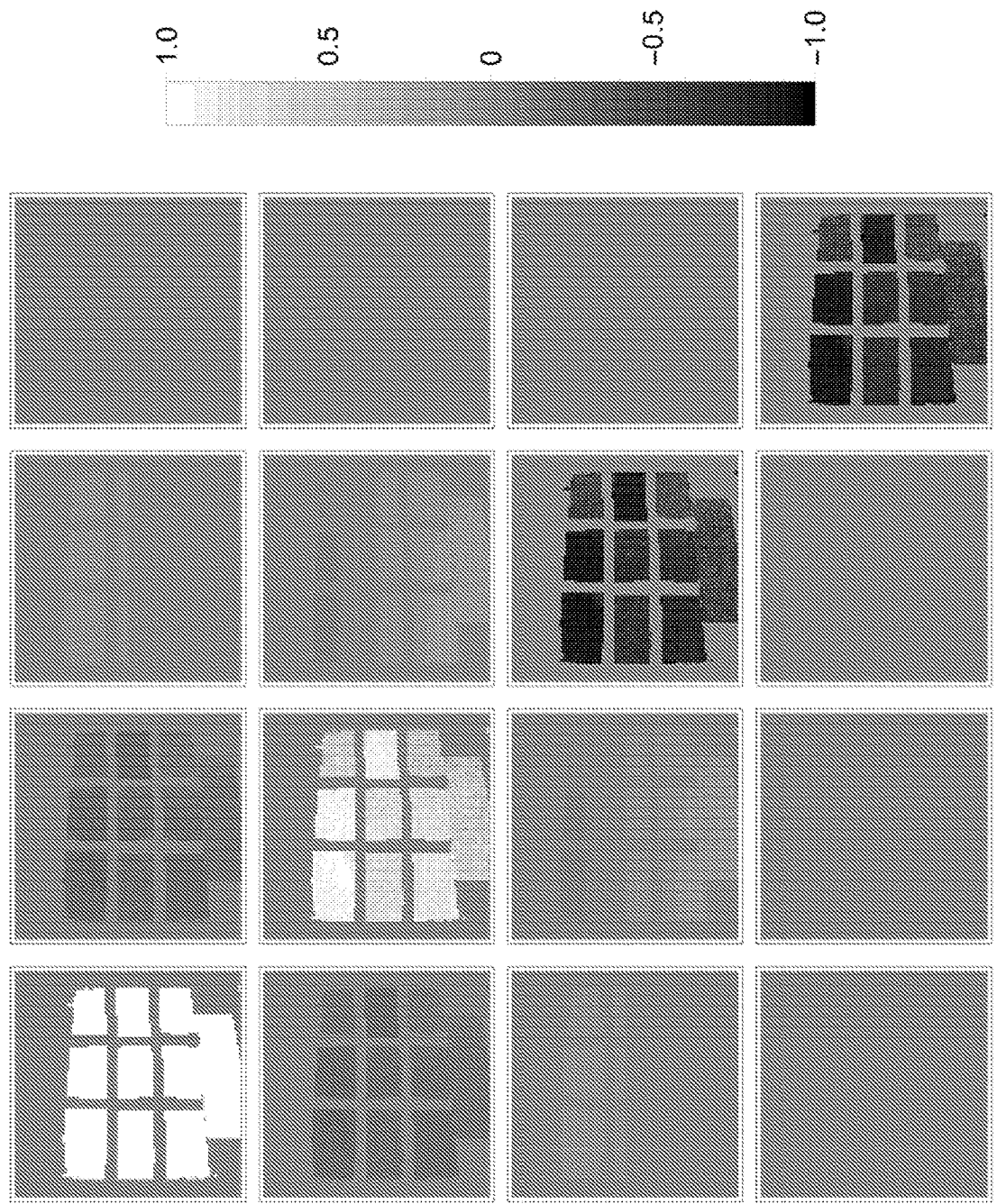
FIG. 7B illustrates a normalized Mueller matrix image of the LEGO brick tower of FIG. 3B that is reconstructed using the extrapolated reduced rank Mueller matrix in accordance with an example embodiment.

FIGS. 7A and 7B show a comparison of normalized Mueller matrix images of the LEGO brick tower reconstructed using full Mueller polarimetry using RGB950 (FIG. 7A) and extrapolated from linear Stokes measurements (FIG. 7B). As noted earlier, prior to the measurements, the nine LEGO bricks were sanded with different sandpaper grits to produce a set of objects with the same material properties and albedo but with varying surface roughness. The results shown in FIGS. 7A and 7B were obtained under 662 nm illumination at $\theta_i = -25°$, $\theta_o = 35°$, and Fresnel reflection was used as the dominant process. The Mueller matrices were normalized for comparison because the radiometric scale factor Moo differs between the two systems. The expected trend of higher depolarization for rougher surface texture is maintained as shown by the top right, middle left and center, and bottom right bricks having smaller on-diagonal values than the other, smoother bricks. In the full Mueller measurements (FIG. 7A), there is some retardance observed oriented in the horizontal direction (non-zero values in the $m_{2,3}$ and $m_{3,2}$ elements). A possible explanation is that rays undergo multiple first-surface reflections from adjacent microfacets in dihedral or trihedral configurations. This apparent retardance increases with scattering geometry and is larger for the rougher bricks. Since these multiple interactions are not described by the Fresnel reflection matrix, their effect does not appear in the extrapolated Mueller matrices.

To compare the extrapolated and reconstructed LEGO brick Mueller matrices, the root mean square error (RMSE) of flux measurements by the RGB950 were calculated as:

$$RMSE = \sqrt{\frac{1}{40}\sum_{j=1}^{40}(p_j - \tilde{p}_j)^2}, \quad (19)$$

where $p_j$ are the elements of the flux vector produced by applying $W_{40}$ to the Mueller matrix from the RGB950 and $\tilde{p}_j$ are the elements of the flux vector produced by applying $W_{40}$ to the Mueller matrix extrapolated from linear Stokes measurements. The RMSE results over acquisition geometry for a 2×2 pixel region on each brick in the LEGO tower indicate that, for $\theta_i = -10°$, $-25°$, and $-40°$ (the first 18 measurement indices), RMSE tends to increase with scattering angle $\theta_o$. For $\theta_i = -55°$ and $-70°$ (measurement indices 19 through 30), the trend becomes less consistent with scattering angle but tends to be higher overall. The maximum RMSE is 0.318 and occurs for the bottom right brick at $\theta_i = -40°$, $\theta_o = 70°$. A possible explanation for this would be that the dynamic range of the commercial linear Stokes camera is not sufficient to capture the low throughput when the angle of incidence onto the microfacets is around Brewster's angle. The fixed PSG state used with the linear Stokes camera was horizontally polarized, but this is more aligned with p-polarization that is not reflected near Brewster's angle.

As described herein, for materials which are described by the simple triple degenerate polarized light scattering model, the disclosed embodiments provide a simplified way to measure the Mueller matrix. Whereas typical Mueller polarimetry requires 16 or more polarimetric measurements to reconstruct a Mueller matrix, the disclosed embodiments allow extrapolation from as few as two measurements. Existing methods for extrapolating full Mueller matrices from partial polarimetry are only valid for non-depolarizing Mueller matrices, which fall significantly short of what is needed to characterize real-world material and optical system with depolarizing optical interactions.

The example results described in this patent document demonstrate excellent results that obtained despite reducing the number of measurements by at least a factor of 10. For example, simulation results show a root mean squared error in eigenvalue estimates averaged over acquisition geometry for a white and a gray balance card were 0.027 and 0.025 respectively for the linear Stokes camera, and 0.019 and 0.032 respectively for the full Mueller matrix (presumed ground truth) polarimeter. Extrapolations at different geometries of LEGO bricks with varying roughness were performed with a commercial linear Stokes camera and compared to the full Mueller matrix polarimeter reconstructions. The depolarization, which varies with surface roughness, was apparent even to visual inspection of the diagonal elements of the extrapolated Mueller matrices.

Figure 8:
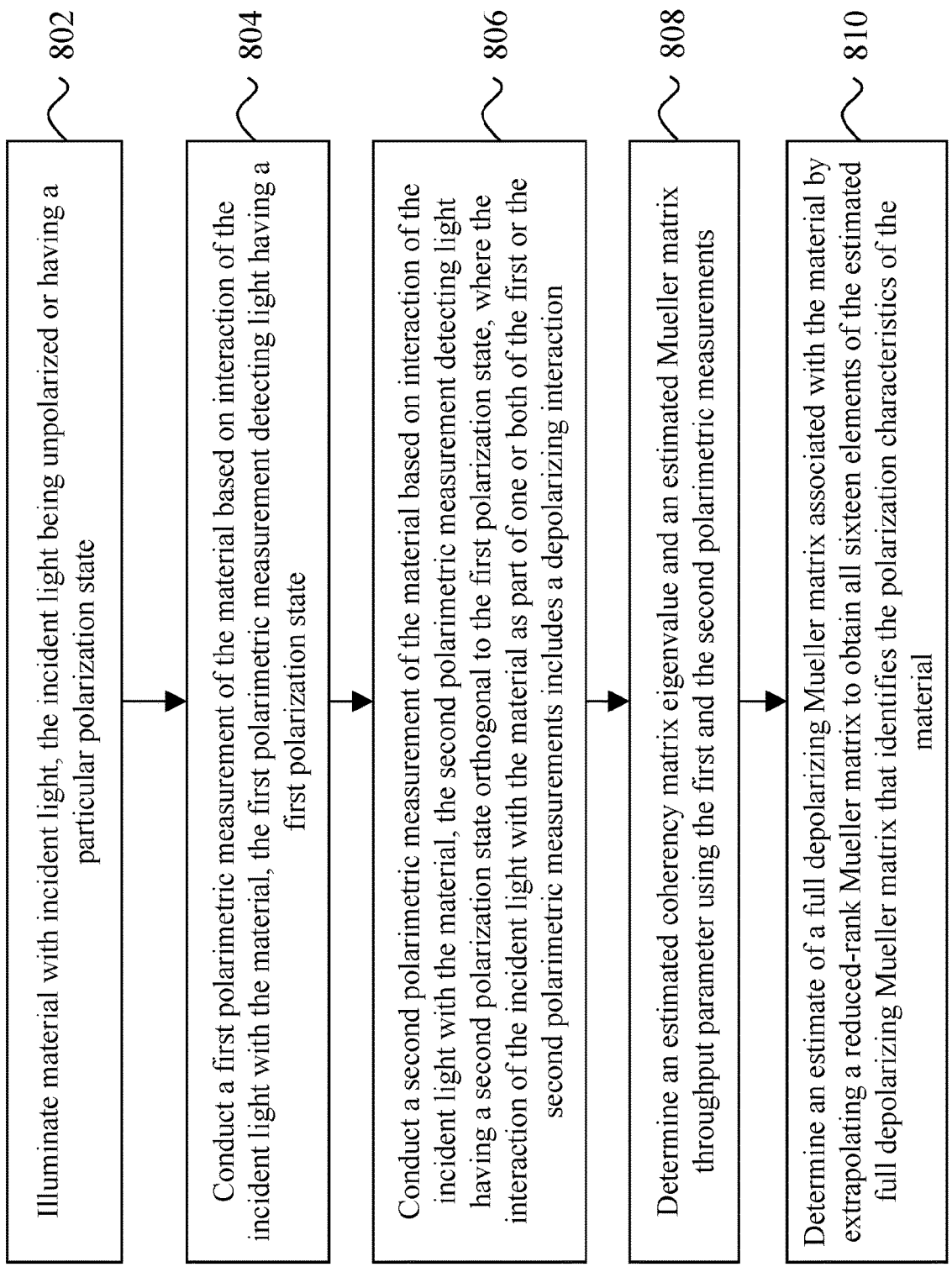
FIG. 8 illustrates a set of operations that can be carried out to estimate polarization characteristics of a material in accordance with an example embodiment.

FIG. 8 illustrates a set of operations that can be carried out to estimate polarization characteristics of a material in accordance with an example embodiment. At 802, the material is illuminated with incident light. The incident light is unpolarized or has a particular polarization state. At 804, a first polarimetric measurement of the material is conducted based on interaction of the incident light with the material; the first polarimetric measurement detects light having a first polarization state. At 806, a second polarimetric measurement of the material is conducted based on interaction of the incident light with the material; the second polarimetric measurement detects light having a second polarization state that is orthogonal to the first polarization state. The interaction of the incident light with the material as part of one or both of the first or the second polarimetric measurements includes a depolarizing interaction. At 808, an estimated coherency matrix eigenvalue and an estimated Mueller matrix throughput parameter are determined using the first and the second polarimetric measurements. At 810, an estimate of a full depolarizing Mueller matrix associated with the material is determined by extrapolating a reduced-rank Mueller matrix to obtain all sixteen elements of the estimated full depolarizing Mueller matrix that identifies the polarization characteristics of the material.

In one example embodiment, determining the estimate of a full depolarizing Mueller matrix includes using (a) the estimated coherency matrix eigenvalue, (b) the estimated Mueller matrix throughput parameter, (c) a Mueller matrix associated with a dominant non-depolarizing process, and (d) an ideal depolarizing Mueller matrix. In another example embodiment, the Mueller matrix associated the dominant non-depolarizing process and the ideal depolarizing Mueller matrix are dependent on each other through the estimated coherency matrix eigenvalue. In yet another example embodiment, the estimated coherency matrix eigenvalue determines a relative weight between the dominant non-depolarizing process and the ideal depolarizing Mueller matrix.

According to another example embodiment, the dominant non-depolarizing process corresponds to Fresnel reflection. In one example embodiment, the Fresnel reflection is selected as the dominant non-depolarizing process upon a determination that a polarizance amplitude associated with the material is monotonically increasing as a function of an angle of incidence of the incident light, reaches a peak at a particular angle, and then monastically decreases. In yet another example, embodiment, the dominant non-depolarizing process corresponds to Fresnel transmission. In still another example embodiment, the Fresnel transmission is selected as the dominant non-depolarizing process upon a determination that a polarizance amplitude associated with the material is monotonically increasing as a function of an angle of incidence of the incident light In another example embodiment, the reduced rank Mueller matrix is a rank eight triply degenerate Mueller matrix. In one example embodiment, determining the estimate of a full depolarizing Mueller matrix includes conducting the first and the second polarimetric measurements for a range of angles of incidence and a range of angles of detection, and determining the estimate of the full depolarizing Mueller matrix associated with the material based on the first and the second polarimetric measurements conducted for each pair of incident and detection angles. In yet another example embodiment, determining the estimate of a full depolarizing Mueller matrix includes conducting the first and the second polarimetric measurements for a range of wavelengths of the incident light, and determining the estimate of the full depolarizing Mueller matrix associated with the material based on the first and the second polarimetric measurements conducted for the range of wavelengths of the incident light.

In one example embodiment, the first and the second polarimetric measurements are conducted simultaneously. In another example embodiment, the method for estimating polarization characteristics of the material further includes conducting a third or a fourth polarimetric measurement of the material based on interaction of the incident light with the material and using one or both of the third or a fourth polarimetric measurements to determine the estimate of the full depolarizing Mueller matrix. In this embodiment, the third or the fourth polarimetric measurements detect light having a third or a fourth polarization state, respectively, and at least three of the first, second, third or fourth polarimetric measurements are linearly independent polarimetric measurements.

Another aspect of the disclosed embodiments relates to a system operable to produce estimated polarization characteristics of a material. The system includes a light source configured to produce unpolarized light or light having a particular polarization state, the light source is positioned to illuminate at least a portion of the material. The system further includes a detector positioned to receive reflected or transmitted light after interaction with the material; the detector is configured to detect a first polarization state and a second polarization state of light that is received thereon, where the first and the second polarization states are orthogonal polarization states.

The device also includes a processor, and a memory including instruction stored thereon. The instructions upon execution by the processor cause the processor to determine an estimated coherency matrix eigenvalue and an estimated Mueller matrix throughput parameter using the detections associated with the first and the second polarization states, and to determine an estimate of a full depolarizing Mueller matrix associated with the material by extrapolating a reduced-rank Mueller matrix to obtain all sixteen elements of the estimated full depolarizing Mueller matrix that identifies the polarization characteristics of the material.

In one example embodiment, the light source is a light emitting diode (LED). In another example embodiment, the system includes a rotation or translation stage configured to allow a range of angles of illumination and angles of detection pairs to be produced. In another example embodiment, the instructions upon execution by the processor cause the processor to determine the estimate of the full depolarizing Mueller matrix by using at least (a) the estimated coherency matrix eigenvalue, (b) the estimated Mueller matrix throughput parameter, (c) a Mueller matrix associated with a dominant non-depolarizing process, and (d) an ideal depolarizing Mueller matrix. In yet another example embodiment, the Mueller matrix associated the dominant non-depolarizing process and the ideal depolarizing Mueller matrix are dependent on each other through the estimated coherency matrix eigenvalue.

According to another example embodiment, the dominant non-depolarizing process corresponds to one of Fresnel reflection or Fresnel transmission. In still another example embodiment, the reduced rank Mueller matrix is a rank eight triply degenerate Mueller matrix. In another example embodiment, the detector is configured to detect the first polarization state and the second polarization state simultaneously. In on example embodiment, the detector is configured to detect a third and a fourth polarization state of light that is incident thereon, each of the first, the second, the third and the fourth polarization states are different from one another, and the instructions upon execution by the processor cause the processor to additionally use one or both of the detections associated with third or the fourth polarization states to determine the estimate of the full depolarizing Mueller matrix. In one example embodiment, the detector includes a charged coupled device (CCD).

Another aspect of the disclosed embodiments relate to a device that includes a processor, and a memory including instruction stored thereon. The instructions upon execution by the processor cause the processor to receive information representing two polarimetric measurements: a first of the two polarimetric measurements being based on interaction of an incident light with a material and detection of a first polarization state; a second of the two polarimetric measurements being based on interaction of the incident light with the material and detection of the second polarization state. The first and the second polarization states are orthogonal to each other and the interaction of the incident light with the material as part of one or both of the first or the second polarimetric measurements includes a depolarizing interaction, The instructions upon execution by the processor also cause the processor to determine an estimated coherency matrix eigenvalue and an estimated Mueller matrix throughput parameter using the information representing the two polarimetric measurements; and determine an estimate of a full depolarizing Mueller matrix associated with the material by extrapolating a reduced-rank Mueller matrix to obtain all sixteen elements of the estimated full depolarizing Mueller matrix that identifies the polarization characteristics of the material.

Figure 9:
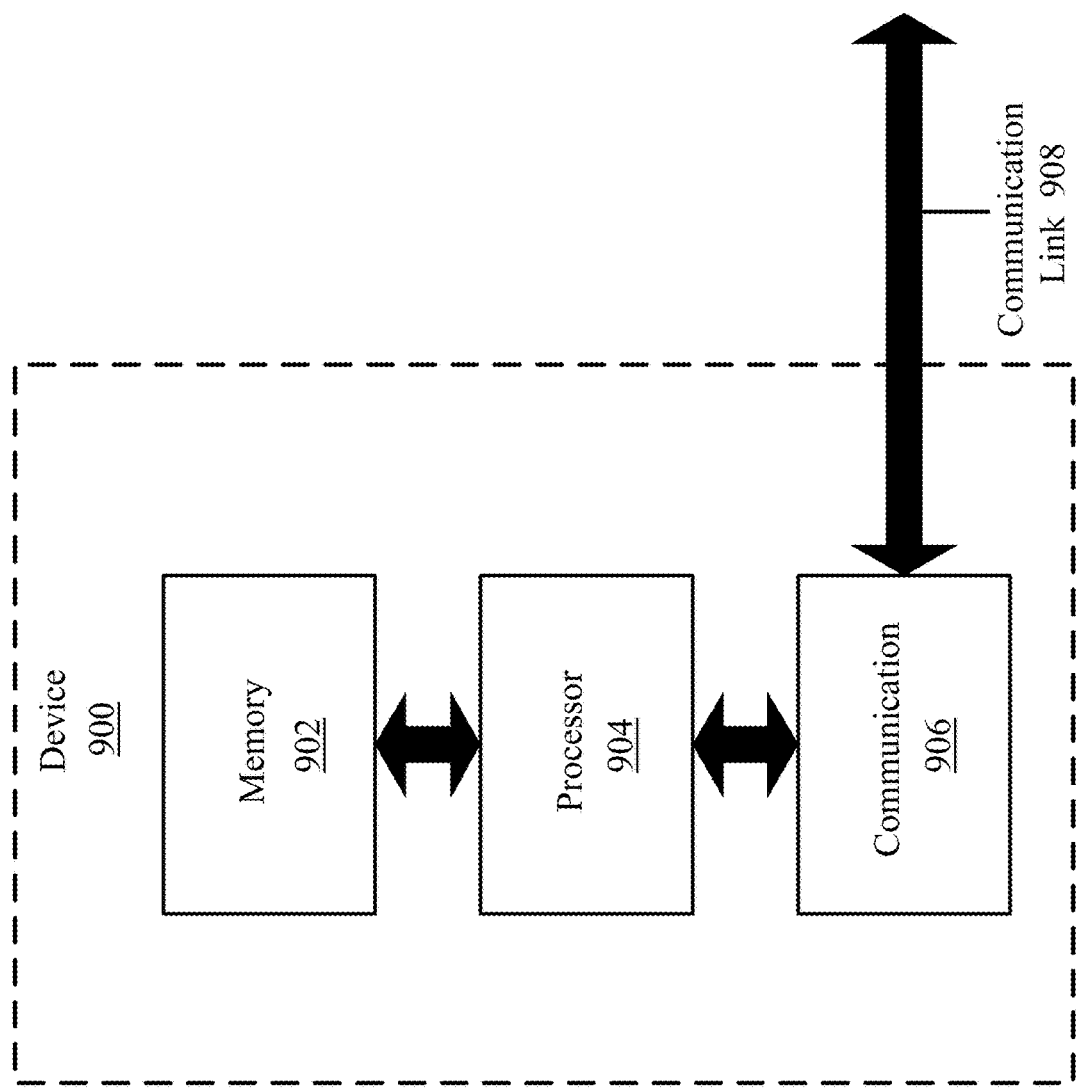
FIG. 9 illustrates an example device that can be used as part of at least some of the disclosed embodiments.

FIG. 9 illustrates one example device that may be used to implement at least some of the disclosed embodiments. For example, the device 900 of FIG. 9 can be used to receive, process, store, provide for display and/or transmit various data and signals associated with disclosed measurements and computations that are disclosed herein. The device 900 comprises at least one processor 904 and/or controller, at least one memory 902 unit that is in communication with the processor 904, and at least one communication unit 906 that enables the exchange of data and information, directly or indirectly, through the communication link 908 with other entities, devices, databases and networks. The communication unit 906 may provide wired and/or wireless communication capabilities in accordance with one or more communication protocols, and therefore it may comprise the proper transmitter/receiver, antennas, circuitry and ports, as well as the encoding/decoding capabilities that may be necessary for proper transmission and/or reception of data and other information. The example device 900 of FIG. 9 may be integrated as part of larger component (e.g., a computer, tablet, smart phone, etc.). For example, in some embodiments, the device 900 may be used to perform (or trigger) one or more of the following actions: control the illumination source; control a translation/rotation stage that is configured to translate/rotate the illumination source, the detector and/or the sample; control an operation of the detector; control the reception of measurement information from the detector; perform the various computation and estimations disclosed herein.

Figure 10:
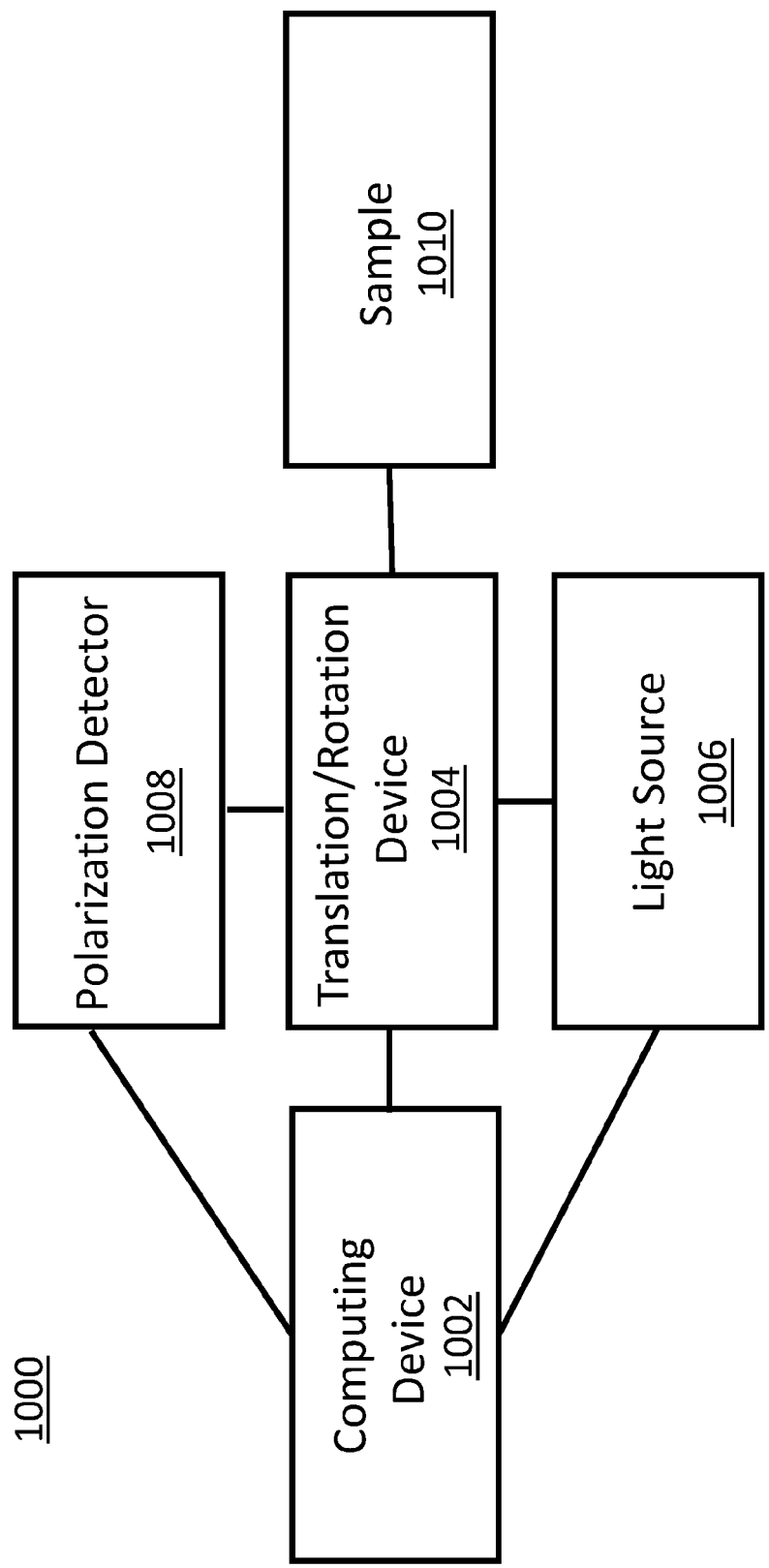
FIG. 10 illustrates a block diagram of system including various components and connections therebetween that can be used for implementing some of the disclosed embodiments.

FIG. 10 illustrates a block diagram of system 1000 including various components and connections therebetween that can be used for implementing some of the disclosed embodiments. A computing device 1002 (e.g., the device of FIG. 9) can be used to control the operations of the polarization detector 1008, the translation/rotation device 1004, and the light sources 1006. The translation/rotation device 1004 may be configured to move one or all of the sample 1010 (e.g., an object), polarization detector 1008 or the light source 1006 to enable polarimetric measurements using different angles of incidence and angles of detection. In some embodiments, the spectral output of the light source 1006 may be changed to allow polarimetric measurements at different wavelengths. The detection results (e.g., two polarimetric detections conducted simultaneously) may be received by the computing device 1002 in the form of electrical signals (e.g., analog or digital signals) for further processing and computations to enable the determination of various parameters and matrices disclosed herein.

Various operations disclosed herein can be implemented using a processor/controller is configured to include, or be couple to, a memory that stores processor executable code that causes the processor/controller carry out various computations and processing of information. The processor/controller can further generate and transmit/receive suitable information to/from the various system components, as well as suitable input/output (IO) capabilities (e.g., wired or wireless) to transmit and receive commands and/or data. The processor/controller may receive the information associated with optical rays and material parameters, and further process that information to simulate or trace rays throughout an optical system.

Various information and data processing operations described herein may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media that is described in the present application comprises non-transitory storage media. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

Only a few implementations and examples are described and other implementations, enhancements and variations can be made based on what is described and illustrated in this patent document. Various embodiments disclosed herein may be combined and, the disclosed method steps can be performed in a different order unless prohibited based on the context.

I claim:

1. A method for estimating polarization characteristics of a material, the method comprising:
   illuminating the material with incident light, the incident light being unpolarized or having a particular polarization state;
   conducting a first polarimetric measurement of the material based on interaction of the incident light with the material, the first polarimetric measurement detecting light having a first polarization state;
   conducting a second polarimetric measurement of the material based on interaction of the incident light with the material, the second polarimetric measurement detecting light having a second polarization state that is orthogonal to the first polarization state, wherein the interaction of the incident light with the material as part of one or both of the first or the second polarimetric measurements includes a depolarizing interaction;
   determining an estimated coherency matrix eigenvalue and an estimated Mueller matrix throughput parameter using the first and the second polarimetric measurements; and determining an estimate of a full depolarizing Mueller matrix associated with the material by extrapolating a reduced-rank Mueller matrix to obtain all sixteen elements of the estimated full depolarizing Mueller matrix that identifies the polarization characteristics of the material.

2. The method of claim 1, wherein determining the estimate of a full depolarizing Mueller matrix includes using (a) the estimated coherency matrix eigenvalue, (b) the estimated Mueller matrix throughput parameter, (c) a Mueller matrix associated with a dominant non-depolarizing process, and (d) an ideal depolarizing Mueller matrix.

3. The method of claim 2, wherein the Mueller matrix associated the dominant non-depolarizing process and the ideal depolarizing Mueller matrix are dependent on each other through the estimated coherency matrix eigenvalue.

4. The method of claim 3, wherein the estimated coherency matrix eigenvalue determines a relative weight between the dominant non-depolarizing process and the ideal depolarizing Mueller matrix.

5. The method of claim 2, wherein the dominant non-depolarizing process corresponds to Fresnel reflection.

6. The method of claim 5, wherein the Fresnel reflection is selected as the dominant non-depolarizing process upon a determination that a polarizance amplitude associated with the material is monotonically increasing as a function of an angle of incidence of the incident light, reaches a peak at a particular angle, and then monastically decreases.

7. The method of claim 2, wherein the dominant non-depolarizing process corresponds to Fresnel transmission.

8. The method of claim 7, wherein the Fresnel transmission is selected as the dominant non-depolarizing process upon a determination that a polarizance amplitude associated with the material is monotonically increasing as a function of an angle of incidence of the incident light.

9. The method of claim 1, wherein the reduced rank Mueller matrix is a rank eight triply degenerate Mueller matrix.

10. The method of claim 1, wherein determining the estimate of a full depolarizing Mueller matrix includes:
conducting the first and the second polarimetric measurements for a range of angles of incidence and a range of angles of detection; and
determining the estimate of the full depolarizing Mueller matrix associated with the material based on the first and the second polarimetric measurements conducted for each pair of incident and detection angles.

11. The method of claim 1, wherein determining the estimate of a full depolarizing Mueller matrix includes:
conducting the first and the second polarimetric measurements for a range of wavelengths of the incident light; and
determining the estimate of the full depolarizing Mueller matrix associated with the material based on the first and the second polarimetric measurements conducted for the range of wavelengths of the incident light.

12. The method of claim 1, wherein the first and the second polarimetric measurements are conducted simultaneously.

13. The method of claim 1, further including conducting a third or a fourth polarimetric measurement of the material based on interaction of the incident light with the material, and using one or both of the third or a fourth polarimetric measurements to determine the estimate of the full depolarizing Mueller matrix, wherein the third or the fourth polarimetric measurements detect light having a third or a fourth polarization state, respectively, and wherein at least three of the first, second, third or fourth polarimetric measurements are linearly independent polarimetric measurements.

14. A system operable to produce estimated polarization characteristics of a material, comprising:
a light source configured to produce unpolarized light or light having a particular polarization state, the light source positioned to illuminate at least a portion of the material;
a detector positioned to receive reflected or transmitted light after interaction with the material, the detector configured to detect a first polarization state and a second polarization state of light that is received thereon, wherein the first and the second polarization states are orthogonal polarization states;
a processor; and
a memory including instruction stored thereon, wherein the instructions upon execution by the processor cause the processor to:
determine an estimated coherency matrix eigenvalue and an estimated Mueller matrix throughput parameter using the detections associated with the first and the second polarization states, and
determine an estimate of a full depolarizing Mueller matrix associated with the material by extrapolating a reduced-rank Mueller matrix to obtain all sixteen elements of the estimated full depolarizing Mueller matrix that identifies the polarization characteristics of the material.

15. The system of claim 14, wherein the light source is a light emitting diode (LED).

16. The system of claim 14, comprising a rotation or translation stage configured to allow a range of angles of illumination and angles of detection pairs to be produced.

17. The system of claim 14, wherein the instructions upon execution by the processor cause the processor to determine the estimate of the full depolarizing Mueller matrix by using at least (a) the estimated coherency matrix eigenvalue, (b) the estimated Mueller matrix throughput parameter, (c) a Mueller matrix associated with a dominant non-depolarizing process, and (d) an ideal depolarizing Mueller matrix.

18. The system of claim 17, wherein the Mueller matrix associated the dominant non-depolarizing process and the ideal depolarizing Mueller matrix are dependent on each other through the estimated coherency matrix eigenvalue.

19. The system of claim 17, wherein the dominant non-depolarizing process corresponds to one of Fresnel reflection or Fresnel transmission.

20. The system of claim 14, wherein the reduced rank Mueller matrix is a rank eight triply degenerate Mueller matrix.

21. The system of claim 14, wherein the detector is configured to detect the first polarization state and the second polarization state simultaneously.

22. The system of claim 14, wherein:
the detector is configured to detect a third or a fourth polarization state of light that is incident thereon,
each of the first, the second, the third and the fourth polarization states are different from one another, and
the instructions upon execution by the processor cause the processor to additionally use one or both of the detections associated with third or the fourth polarization states to determine the estimate of the full depolarizing Mueller matrix.

23. The system of claim 14, wherein the detector includes a charged coupled device (CCD).

24. A device, comprising:
a processor; and a memory including instruction stored thereon, wherein the instructions upon execution by the processor cause the processor to:
receive information representing two polarimetric measurements, a first of the two polarimetric measurements being based on interaction of an incident light with a material and detection of a first polarization state, and a second of the two polarimetric measurements being based on interaction of the incident light with the material and detection of a second polarization state, wherein the first and the second polarization states are orthogonal to each other and the interaction of the incident light with the material as part of one or both of the first or the second polarimetric measurements includes a depolarizing interaction;
determine an estimated coherency matrix eigenvalue and an estimated Mueller matrix throughput parameter using the information representing the two polarimetric measurements; and
determine an estimate of a full depolarizing Mueller matrix associated with the material by extrapolating a reduced-rank Mueller matrix to obtain all sixteen elements of the estimated full depolarizing Mueller matrix that identifies the polarization characteristics of the material.

* * * * *